Aug. 3, 1965  L. L. WOLFSON  3,198,005
MULTI-PANEL SLIME ACCUMULATOR
Filed Jan. 8, 1962  2 Sheets-Sheet 1

Inventor
Leonard L. Wolfson
By Marzall, Johnston, Cook & Root
Attorneys

Aug. 3, 1965   L. L. WOLFSON   3,198,005
MULTI-PANEL SLIME ACCUMULATOR
Filed Jan. 8, 1962   2 Sheets-Sheet 2

Inventor
Leonard L. Wolfson
By Marzall Johnston, Cook & Root
Attorneys

3,198,005
MULTI-PANEL SLIME ACCUMULATOR
Leonard L. Wolfson, Park Forest, Ill., assignor to Nalco Chemical Company, Chicago, Ill., a corporation of Delaware
Filed Jan. 8, 1962, Ser. No. 164,669
7 Claims. (Cl. 73—53)

This invention relates to a multi-panel slime accumulator useful for collecting specimens of bacterial slimes, chemical slimes and deposits which frequently occur in several types of industrial process water system. Specifically, the invention relates to a device useful in the collection and evaluation of bacterial and chemical deposits of the types commonly occurring in cooling towers and paper mills.

Many industrial process water systems contain quantities of suspended or dissolved organic and inorganic chemicals due to temperature conditions, pH factors and other environmental circumstances. Such undesirable phenomena as bacteriological growth, precipitation, scale formation and the like occur. Problems of this type are particularly troublesome in the operation of cooling towers and in certain areas of paper mill systems.

Deposits, which are most prevalently slime accumulations, are found in the "fill" section of cooling towers and in white water systems of paper mills. In paper mills such microbiological species as *Aerobacter aerogenes*, Pseudomonas, several species of Flavobacterium, true and false fungi and mucoid bacteria, when allowed to grow unchecked, build up into masses which accumulate on the various surfaces found in paper mill systems. Wood, metal and concrete often will be coated with large beard-like masses which will slough off into the mill system, causing damage to paper being produced as well as sometimes impeding flow characteristics and capacity of equipment.

In cooling towers such organisms as *Aerobacter aerogenes*, Flavobacterium, Pseudomonas, spore forming bacteria, true and false fungi and algae also form deposits which are most frequently found in the fill sections. Here, again, these deposits are troublesome in that they diminish operational efficiency, reduce heat transfer coefficients and generally affect cooling efficiency of the tower.

While microbiological deposits are most troublesome in paper mills and cooling towers, other forms of harmful deposits are found in these systems. Chemical slimes composed of residual organic matter are often encountered along with such problems as inorganic scale and mixed organic-inorganic corrosion products which form as slime-like masses.

It is customary to treat various types of industrial process water systems having problems of the type described above with a variety of chemicals to alleviate or abolish otherwise undesirable deposits. It is a difficult matter to evaluate the efficiency of such chemical treatments as bactericides, fungicides, algaecides, corrosion inhibitors and dispersants in the laboratory. One of the most difficult problems resides in the reproduction of deposits on a small laboratory scale. When it is desired to test various chemicals in full scale industrial process water systems there is always a danger that the chemicals may do more harm than good.

One approach to the evaluation of chemicals for the treatment of deposits which form in industrial process water systems resides in the use of "slime boards" which are inserted into the systems at strategic points and which are removed for visual chemical or microbiological evaluation. These boards, while serving to some extent to build up deposits in actual industrial systems, have several disadvantages. For example, many of these single board units are not suitable for laboratory evaluations simulating actual field conditions. Oftentimes a single board must be periodically taken from the environment of the aqueous systems to be tested, cleaned and evaluated and then reinserted back into the system. Further evaluation using the same board gives sometimes erroneous results which conflict with actual existing conditions of the system. Again, many of these units if actually placed in the system to be tested cause interference with flow conditions and/or are injurious to the particular process involved. Another disadvantage often occurring in laboratory test equipment is that the particular test apparatus used is frequently constructed of a single type of material and it is not possible to duplicate the several materials which compose the industrial system to be investigated by testing.

Another serious disadvantage of many prior art slime testing apparatuses lies in non-uniform slime build-up on the particular surface to be used for testing purposes. A representative picture of the system as a whole is therefore not given to the technician conducting the testing program.

Still further disadvantage of many slime test units is their inability to be placed in a wide variety of different locations throughout the overall industrial process system. Again, many slime testing units can be run only for a relatively short period of time before substantial build-up makes subsequent testing impossible or impractical. Lastly, many slime or microbiological testing units have the inherent disadvantage of only being available for use in a single system.

It therefore would be of benefit to the art if a slime testing apparatus could be devised which is suitable for a relatively long term testing program involving periodic sampling without resort to complex single cleaning and testing procedures. If this same unit could be adaptable to a wide variety of industrial systems involving a continuous flow of water, but nevertheless give results reproducible of conditions in those same systems, it would be an extremely useful tool to those involved in combating deleterious conditions existing in those systems. Lastly, a most important benefit would be derived, if test chemicals could be introduced into the apparatus without chemical addition to the industrial process system to be controlled. Such an advantage becomes of particular moment in case of test failure.

It therefore becomes an object of the invention to provide a slime accumulator apparatus containing a plurality of removable panels, which apparatus is useful for a continuous, relatively long-term testing program involving easy periodic removal of these panels for incremental inspection and examination.

Another object is to provide a slime testing apparatus which is adaptable for sampling slime-forming microbes in flowing aqueous systems; but yet, while the apparatus utilizes the exact microbe-containing water to be controlled, test chemicals can be introduced into the test apparatus, completely without resort to chemical contamination of the system itself.

Yet another object is to provide a slime accumulator apparatus involving multiple test panels which allow representative, uniform build-up of microorganisms existing in the system to be tested, thus giving a correct picture of the environmental conditions in that same water system.

A still further object is to provide a slime accumulator testing unit which is admirably suited for use both in laboratory conditions simulating actual field situations, and also in a variety of field situations themselves.

A still further object is to provide a slime accumulator testing apparatus which may be placed in a variety of locations in an industrial process system to test waters in different areas which may be susceptible to microbiological attack.

A specific object of the invention is to provide a slime accumulator testing apparatus adaptable to receive both bacterial and chemical slime causing agents of the type commonly occurring in both cooling towers and paper mills.

For a further understanding of the invention attention is directed to the respective figures in the drawings, of which:

Figure 1:
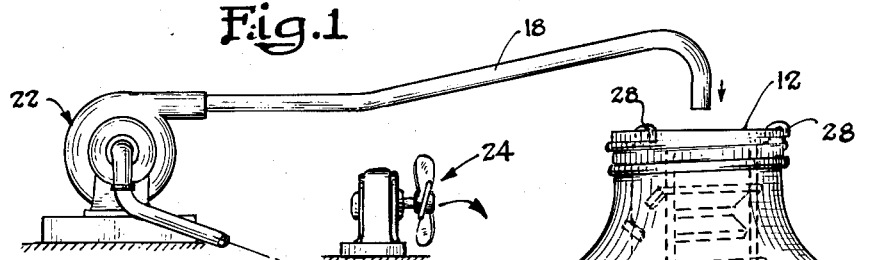
FIG. 1 is a perspective view, cut away in part, of a multi-panel slime accumulator which duplicates conditions of a "fill" section of a conventional industrial cooling tower.

With specific reference to the drawings there is shown in FIG. 1 a typical laboratory test apparatus for growing chemical or microbiological slimes under conditions similar to those found in the "fill" section of a cooling tower. The apparatus comprises a reservoir 10 having an inlet 12 and outlet 14. As is shown in the drawing the inlet 12 is the top portion of the reservoir. In use, the reservoir is partially filled with a typical synthetic industrial process water 16 which may be continuously or intermittently circulated through inlet line 18 and outlet line 20 by means of a recirculating pump 22. To prevent overheating of the system suitable cooling means may also be provided as illustrated by a cooling fan 24.

Suspended within the reservoir 10 and partially extending below the level of the water 13 is a multipanel holder 26 which is suspended at its top by means of wire hooks 28.

Figure 2:
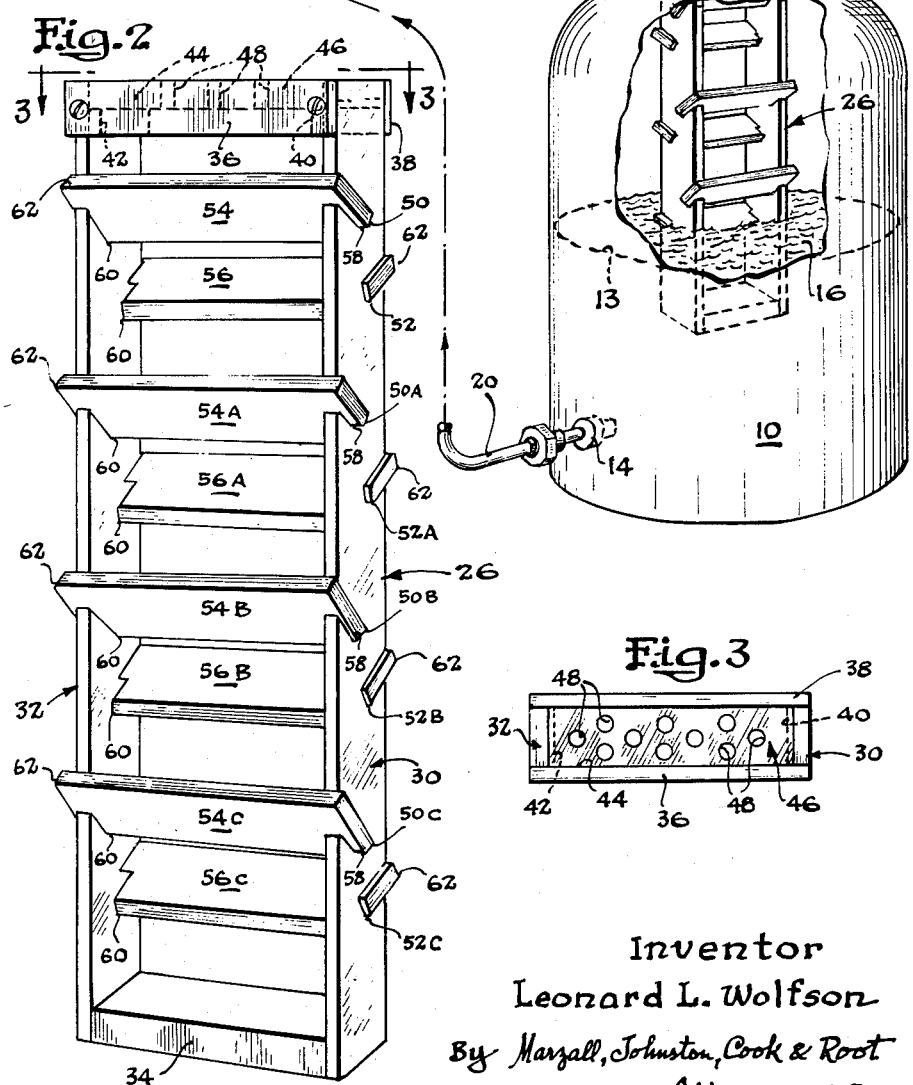
FIG. 2 is an enlarged vertical perspective view showing the multi-panel holder used in the slime accumulator represented in FIGURE 1.
Figure 3:
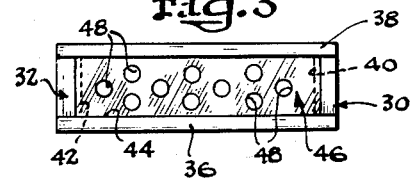
FIG. 3 is a top view of the multi-panel holder taken across lines 3—3 of FIG. 2.

The details of the multipanel holder are shown to best advantage in FIGS. 2 and 3. As can be seen in FIG. 2 the multipanel holder is a rectangular frame having parallel spaced apart vertical sides 30 and 32. The sides are held in spaced apart relationship by the use of a bottom cross piece 34 and two top cross pieces 36 and 38 (see FIG. 3).

Attached perpendicularly to the top cross pieces 36 and 38 and in abutment with sides 30 and 32 are flanges 40 and 42. They each form a shelf extending across sides 30 and 32 at a point slightly below the top of the multipaneled holder 26. This positioning of the flanges in relation to the top cross pieces and sides 30 and 32 provides a recessed area 44.

Adapted to be received in loosely fitting relationship into the recessed area 44 and supported on flanges 40 and 42, is a suitably dimensioned perforated receiver panel 46. The perforated receiver panel receives influent liquid from line 18 and flows it to test panels positioned below, through a plurality of downwardly extending vertical perforations 48. The sides 30 and 32 are provided with a plurality of alternately opposed and diagonally downwardly disposed pairs of slots 50 and 52, 50A and 52A, 50B and 52B and 50C and 52C. These slots preferably each extend at least halfway through the width of sides 30 and 32, so that the leading edge 58 of each test panel inserted there will overhang the leading edge of the test panel just below it.

Fitted into the slots are test panels 54 and 56, 54A and 56A, 54B and 56B and 54C and 56C. When in place, the test panels present pairs of broad liquid-receiving upper surfaces, one below another, inclined toward each other with leading edges 58 lower than trailing edges 62, preferably so that said broad surface is 8°–45° from the horizontal. A 30° inclination is particularly preferred in the case of apparatus illustrated in FIGS. 1–3 of the drawing, and 10° is preferred in the apparatus illustrated in FIGS. 4 and 5.

The pairs are preferably spaced from each other sufficiently to be discernable as such, and may be 2–6 in number. 4 pairs are most preferred.

The extent to which leading edges 58, and the slots listed above, are arranged to overhang each other may be varied depending upon the size of the apparatus and the effect of size upon the velocity of a stream of liquid permitted to flow off of the said leading edges. It is essential that panel spacings and slope be arranged so that liquid will flow from one panel surface to the other in cascade-fashion. The above listed preferred specifications have been found to be particularly suited to test units having a reservoir of about 5 gallons capacity. The leading edges of the test panels, generically numbered 58, rest against the closed ends of the slots generically referred to as 60. The trailing edges of the panels opposite said leading edges, designated by the number 62, extend slightly outside the open ends of the slots in sides 30 and 32, to facilitate test panel insertion and removal. In operation, the multipaneled holder is suspended in the reservoir 10, preferably the lower panels, e.g., 54B and 56B as well as 54C and 56C immersed in the test fluid 16. The fluid is recirculated continuously or intermittently by pump 22. As the fluid leaves line 18 it is flowed upon and across the perforate receiver panel 46. Water flowing through the vertical perforations flows in a cascade manner over the liquid receiving surfaces of the test panels. Arrangement of the panels in conjunction with the flow of water thereover produces a situation realistically similar to those encountered in the "fill" section of a cooling tower.

Experimental laboratory tests with units of the type illustrated in FIGS. 1–3 with the test water being innoculated with bacterial species and media have faithfully reproduced microbiological slime conditions frequently encountered in cooling towers. By utilizing such an apparatus it is possible to evaluate the efficacy of various types of bactericides without necessitating excessive or long field evaluations.

Figure 4:
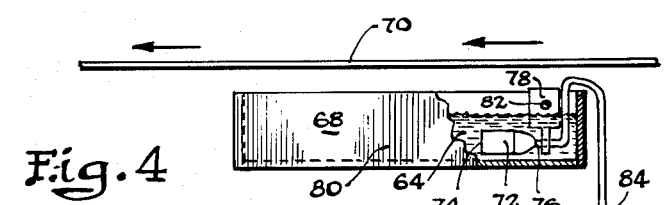
FIG. 4 is a perspective view, cut away in part, of a multi-panel slime accumulator used to sample paper mill white waters to determine slime growing patterns and characteristics.
Figure 5:
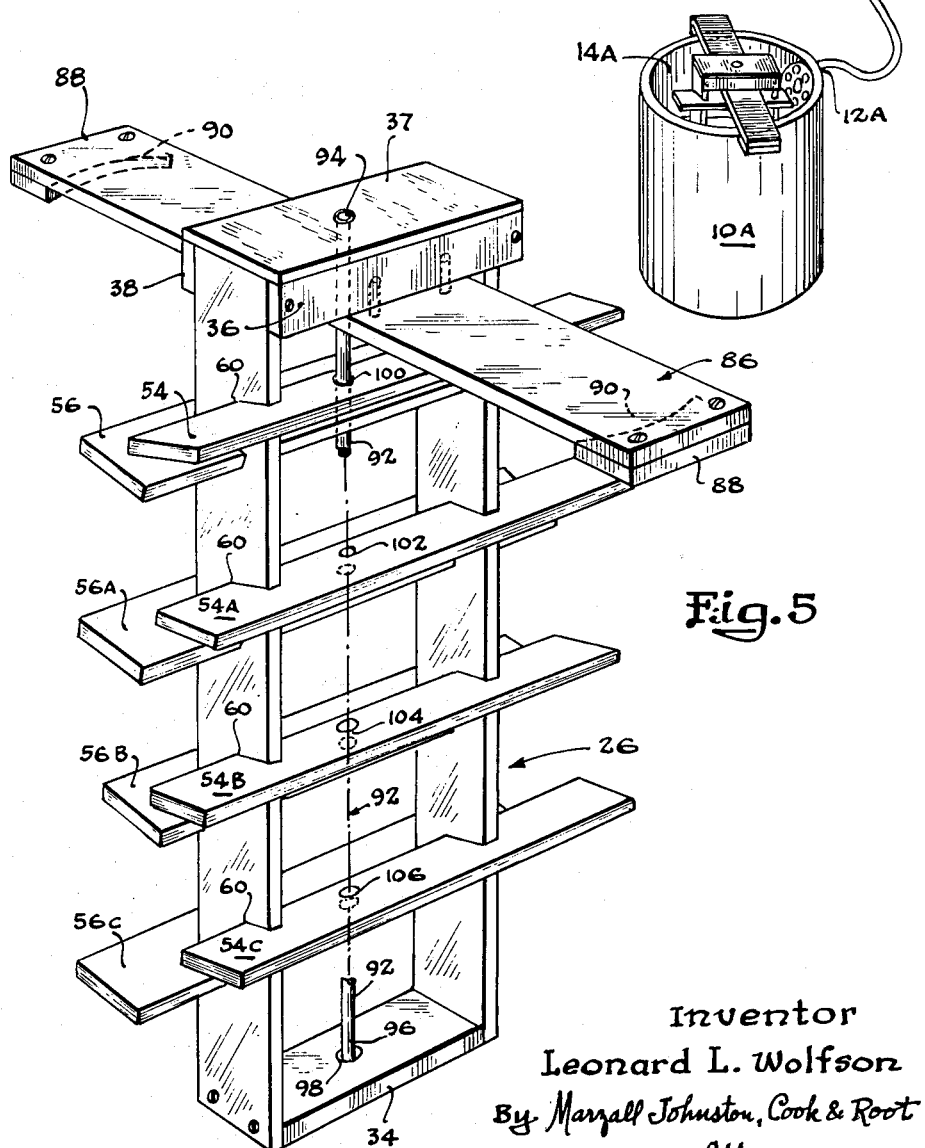
FIG. 5 is an enlarged vertical perspective view of a multi-panel holder of the type used in the slime accumulator shown in FIG. 4.

Another use of the invention is illustrated in FIGS. 4 and 5. The apparatus there depicted is designed for purposes of testing chemicals in paper mill systems without necessitating the actual introduction of such chemicals directly into the system.

The components of the apparatus shown in FIGS. 4 and 5 are similar to those illustrated in FIGS. 1–3 inclusive, with similar parts having similar reference numbers. In FIG. 4 there is afforded a reservoir 10A having an inlet 12A and an outlet 14A. It is of importance to note that the outlet 14A as shown in FIG. 4 serves the dual purpose of not only being an outlet but also is the top of the reservoir 10A. In operation, paper mill white water 64 which is illustrated in the drawing as being from the wire pit 68 located directly beneath a paper machine Fourdrinier wire 70, gives a representative sample typical of mill waters containing slime forming materials.

Positioned in the wire pit below the surface of the white water is a bell shaped receiver 72 having an open mouth 74 and a neck 76 to which is affixed a suitable mounting clamp 78 which engages the side walls 80 of the wire pit 68. The mounting clamp is fitted with an adjustable screw member 82 for locking the mounting clamp firmly in position. Affixed to the neck 76 of the bell shaped receiver is a reservoir inlet line 84. The white water is collected in the bell shaped receiver 72 and conducted through inlet line 84, into the reservoir. In order to maintain the water in a continuously flowing state it is desirable that the reservoir 10A be located below the wire pit thereby providing a gravity flow arrangement from the wire pit to the reservoir.

It is obvious that the water entering the reservoir spills over the top of reservoir, thereby allowing a continuous flow into the reservoir 10A. The spillage from the outlet 14A is readily disposed of by locating the reservoir 10A near a drain or sewer line not shown. If desired to recirculate spillage, reservoir 10A may be placed in or furnished with a surrounding trough arranged to collect spillage for recirculation to inlet 12A by means of appropriate conduit.

As shown to best advantage in FIG. 5, the multipanel holder used in an overflow type reservoir has certain particular constructional design features. Specifically, there is affixed to the bottom of the top cross pieces 36 and 38 horizontally disposed support bracket 86 which has mounted on its ends, reservoir-engaging positioning studs 88 whose reservoir-contacting inner edges 90 are concavely curved so that they frictionally engage the outer walls of the reservoir 10A.

The support bracket 86 maintains the multipaneled holder 26 in a suspended position so that its bottom 34 is in spaced apart relationship to the bottom of the reservoir. Field tests have indicated that since the flow of water in relationship to the multipaneled holder is upflow, the panels tend to be displaced from the slots. To overcome this displacement due to flow characteristics and velocities, the construction features of the multipanel holder in FIG. 5 include a locking rod 92 provided to maintain the panels within the slots of the multipanel holder. The locking rod is inserted through the top 37. The top 37 contains a cut out portion or opening 94 for receiving the locking rod 92. The bottom end 96 of the locking rod is preferably mounted in a recessed area 98 formed or cut in the bottom cross piece or base 34. For the locking rod 92 to engage all of the panels it is necessary that the leading edges of each opposed pair of test panels, e.g., 54–56, 54A–56A, 54C–56C sufficiently overhang each other as described above so that vertical positioning openings or holes, 100, 102, and 104 and 106 may be formed therein so as to align with each other.

The locking rod shown in FIG. 5 passes through the vertical positioning holes. To allow for overhang of the leading edges of panels it is necessary as described above, for the slots to be of sufficient depth to permit the overlap to be achieved.

While the reservoir and the multipanel holder may be constructed from well-known materials of construction it is preferred that rigid plastics such as for instance, "Plexiglas," or other similar acrylic resins be used. However, any other suitable material of durable construction is not precluded.

The particular panels which fit into the slots of the multipanel holder may also be constructed from a host of well-known construction materials, for example, they may be fabricated of wood, glass, steel, concrete, synthetic resins, aluminum, etc. However, it is preferred that the panels be primarily composed of wood in order to allow easy adherence of the slime containing the microbes and other deposits, and subsequent growth thereon. Also, wood panels are preferred insofar as they are easily prepared, inexpensive to produce and readily removable from the multipaneled holder. It is anticipated that test panels used during a given test may be either all made from the same material or constructed from different materials.

It is further noted that test panels may be adapted to extend more or less distance into the slots, by cutting away the corners of the panels at the point where they engage slot ends 60.

Also, the panels may be mounted by providing bracket supports or removable pegs on sides 30 and 32, as well as by nailing or other fastening means.

What I claim is:

1. A multi-panel slime accumulator testing apparatus comprising
   (A) a reservoir having,
      (a) an inlet for receiving industrial process waters and,
      (b) an outlet for discharging said waters;
   (B) a multi-panel holder adapted to fit within said reservoir, said multi-panel holder having,
      (a) a frame having parallel spaced-apart vertical sides,
      (b) a plurality of alternately opposed diagonally downwardly disposed pairs of slots extending at least half-way through the width of the sides of the frame so as to support test panels in cascade flow relationship with respect to each other;
      (c) easily removable test panels adapted to accumulate slime and to fit within said slots;
   (C) support means for suspending the frame in the reservoir; said multi-panel slime accumulator being adapted for study of slime-forming tendencies of said industrial process liquids and for small scale screening and evaluation of slime control chemical treatments.

2. The multi-panel holder of claim 1 where the test panels are formed of different materials.

3. A multi-panel slime accumulator testing apparatus comprising,
   (A) a reservoir having,
      (a) an inlet located at the top of said reservoir for receiving industrial process waters,
      (b) an outlet located near the bottom of the reservoir for discharging said waters;
   (B) means for recirculating the industrial process waters from the reservoir outlet to the reservoir inlet;
   (C) a multi-panel holder adapted to fit within said reservoir, said multi-panel holder having,
      (a) a substantially rectangular frame having parallel spaced-apart vertical sides, a bottom, and an open top adapted to receive a perforate receiver panel, and a perforate receiver panel mounted within said open top,
      (b) a plurality of alternately opposed downwardly disposed pairs of slots formed in the edges of the sides of the frames so as to support test panels in overhanging relationship with respect to each other,
      (c) easily removable test panels adapted to accumulate slime and to fit within said slots;
   (D) support means for partially immersing the frame in the reservoir; said multi-panel slime accumulator being adapted for study of slime-forming tendencies of said industrial process liquids and for small scale screening and evaluation of slime control chemical treatments.

4. The multi-panel slime accumulator of claim 3 having means for cooling the industrial process waters recirculating from the reservoir outlet to the reservoir inlet.

5. A multi-panel slime accumulator testing apparatus comprising,
   (A) a reservoir having,
      (a) an inlet for receiving industrial process waters and,
      (b) an outlet for discharging said waters;
   (B) a multi-panel holder adapted to fit within said reservoir, said multi-panel holder having,
      (a) a substantially rectangular frame having parallel spaced-apart sides, a bottom and a top having cut-out portions for receiving a locking rod,
      (b) a plurality of alternately opposed diagonally downwardly disposed pairs of slots formed in the edges of the sides of the frame, with the slots having sufficient depth so that the closed end of each slot is overhung by the closed end of the slot just above it,
      (c) easily removable panels adapted to accumulate slime and to fit within said slots, said panels each having a cut-out portion adapted to receive said locking rod,
      (d) a locking rod positioned parallel to the sides of the frame and through all said cutout portions for locking the panels in the frame;

(C) support means for partially immersing the frame in the reservoir; said multi-panel slime accumulator being adapted for study of slime-forming tendencies of said industrial process liquids and for small scale screening and evaluation of slime control chemical treatments.

6. The multi-panel slime accumulator of claim 5 where the inlet and outlet are located near the top of the reservoir.

7. The multi-panel slime accumulator of claim 6 where the inlet is fitted with a fluid conductor having a receiver for collecting water flowing in an industrial process water system, said receiver comprising a cup portion and means for mounting the said receiver below the water line of said industrial process water system.

References Cited by the Examiner

UNITED STATES PATENTS

| | | | |
|---|---|---|---|
| 348,917 | 9/86 | Kniese | 261—112 |
| 599,202 | 2/98 | Spoon | 261—111 |
| 1,701,978 | 2/29 | Lakin | 261 |
| 2,197,970 | 4/40 | Elmer | 261 |
| 2,397,458 | 4/46 | Allen | 261 |
| 2,660,884 | 12/53 | Dean | 73—53 |
| 2,719,427 | 10/55 | McKeown | 73—53 |

RICHARD C. QUEISSER, *Primary Examiner.*